H. D. ELLS.

AUTOMOBILE THEFT SIGNAL.

APPLICATION FILED JAN. 26, 1920.

Reissued Oct. 12, 1920. 14,956.

INVENTOR

Hallett D Ells

By Graham + Parris

ATTORNEYS.

UNITED STATES PATENT OFFICE.

HALLETT D. ELLS, OF KANSAS CITY, MISSOURI, ASSIGNOR, BY DIRECT AND MESNE ASSIGNMENTS, TO H. G. MILLER, OF LOS ANGELES, CALIFORNIA.

AUTOMOBILE THEFT-SIGNAL.

14,956. Specification of Reissued Letters Patent. Reissued Oct. 12, 1920.

Original No. 1,108,156, dated August 25, 1914, Serial No. 798,836, filed November 3, 1913. Application for reissue filed January 26, 1920. Serial No. 354,286.

*To all whom it may concern:*

Be it known that I, HALLETT D. ELLS, a citizen of the United States, residing at Kansas City, in the county of Jackson and State of Missouri, have invented certain new and useful Automobile Theft-Signals, of which the following is a specification.

My invention relates to improvements in auto theft signals.

It is particularly adapted for use on an automobile wheel.

The object of my invention is to provide a signal which is provided with means for being releasably locked to an automobile wheel for the purpose of preventing the wheel from revolving, and thereby preventing theft or unauthorized use of the automobile.

In the accompanying drawings which illustrate my invention,

Similar reference characters designate similar parts in the different views.

Figure 1:
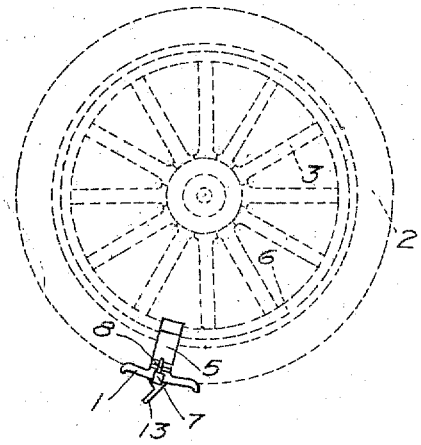
Figure 1 is a side elevation of the preferred form of my invention shown attached to an automobile wheel, the latter being in dotted lines.
Figure 2:
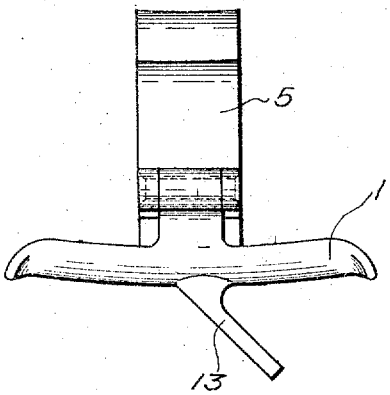
Fig. 2 is an enlarged side elevation of the signal shown in Fig. 1.
Figure 4:
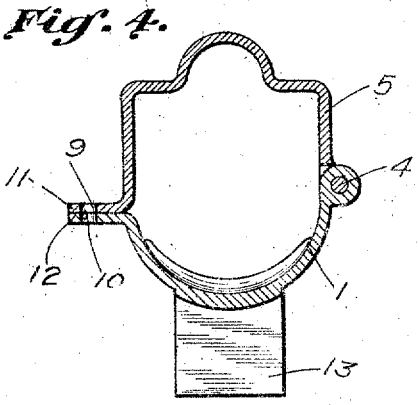
Fig. 4 is a vertical sectional view on the line *c—d* of Fig. 2.
Figure 3:
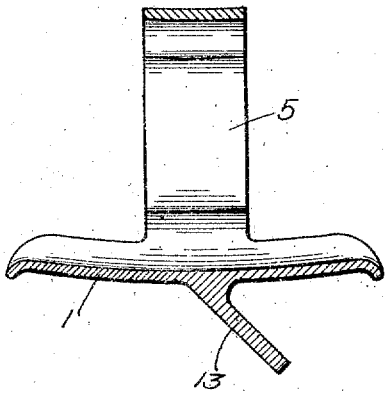
Fig. 3 is a vertical sectional view on the line *a—b* of Fig. 4.

Referring to the first four figures, 1 designates the curved body of a tread member which is adapted to be fitted to the periphery of the tire 2 of an ordinary automobile wheel 3. Hinged to one side of the body 1 by means of a pintle 4 is a clamping member 5 which is adapted to embrace the rim 6 of the automobile wheel as shown in Fig. 1, and to have its free end releasably locked to the opposite side of the body 1 by means of a padlock 7, the hasp 8 of which is adapted to be inserted through two holes 9 and 10 provided respectively in laterally extending flanges 11 and 12 with which the members 5 and 1 are provided. Extending outwardly and preferably obliquely, from the underside of the body 1 is a projection or spike 13 which is adapted to strike the ground and serve as a bumping member to prevent the wheel 3 being revolved, or in case that sufficient power is operated to cause the wheel to revolve, the projection 13 will cause the wheel to be raised from the ground and then permitted to drop during each revolution. When the owner or operator of the automobile desires to use the same, the padlock 7 is removed, after which the member 5 may be swung so as to permit the signal to be removed from the wheel.

The ends of the body 1, as shown in the drawing, are preferably outwardly curved so as to prevent their cutting the tire 2.

Figure 5:
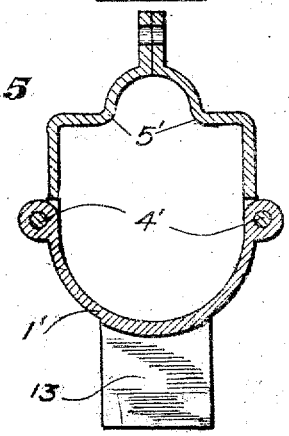
Fig. 5 is a modified form of my invention provided with two clamping arms pivoted to opposite sides of the tread member.

In the form of my invention shown in Fig. 5, two arms 5′ are respectively pivoted to opposite sides of the body 1′ by means of two parallel longitudinal pintles 4′. The free ends of the arms 5′ are provided respectively with holes therethrough for receiving the hasp of a padlock, such as is shown in Fig. 1. The body 1′ is provided with downwardly and obliquely extending projection 13 corresponding in function and mode of operation to the corresponding part in the other form of my invention.

When the owner or operator of an automobile desires to leave the vehicle without guard he may apply to one of the wheels a signal corresponding to the one shown in Fig. 1 or that shown in Fig. 5, and releasably secure the same to the wheel by means of a suitable padlock, as hereinbefore described. If any unauthorized person attempts to use the vehicle the chock will interfere with the revolving of the wheel and will either prevent the running of the automobile, or by the irregular movement of the wheel will prevent rapid running of the machine and will serve to effect the detection of the person who attempts the unauthorized use of the vehicle.

I am aware that previous inventors have sought to prevent the movement of vehicles by attaching to a wheel a chock of sufficient size to prevent the vehicle from being moved. My invention differs from all such previous attempts and is broadly new and basic in that I provide a device which is small enough to pass freely under the wheel to which it is attached and the ground, and large enough to give an unmistakable bumping movement to that wheel which movement is sufficiently noticeable to call the public's attention to the operation of the vehicle. In other words, I do not attempt to prevent the operation of the vehicle nor the rotation of its wheel but on the contrary I utilize this movement and rotation to signal to the public that the vehicle is being operated by an unauthorized person.

I claim as my invention:—

1. An auto theft signal comprising a body adapted to engage the tread of the tire of an automobile wheel, said body having a projection extending outwardly beyond the tread of a tire on said wheel, said projection being of such size and shape as to permit the wheel to be freely rotated with the signal in place on the wheel, thus raising the wheel from the ground and imparting a marked bumping motion thereto, an arm engaging said body and adapted to be swung into a closed position in engagement with the wheel, and releasable means for locking the free end of said arm to the opposite side of said body.

2. An auto theft signal comprising a body adapted to engage the tread of the tire of an automobile wheel, said body having a projection extending outwardly beyond the tread of a tire on said wheel, said projection being of such a size and shape that it will permit the wheel to be rotated freely with the signal in place on the wheel, thus raising the wheel from the ground and imparting a marked bumping motion thereto, an arm pivoted to said body and adapted to be swung into closed position with the rim of the wheel, and releasable means for locking said arm in the closed position.

In testimony whereof, I have hereunto subscribed my name.

HALLETT D. ELLS.